J. B. CRUMP.
APPARATUS FOR PLANTING SEED POTATOES.
APPLICATION FILED SEPT. 2, 1919.
1,401,885.
Patented Dec. 27, 1921.
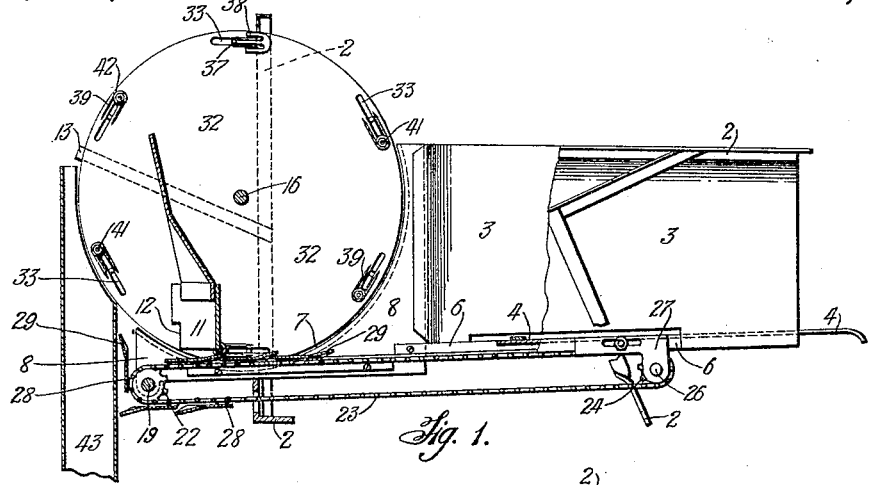
Fig. 1.
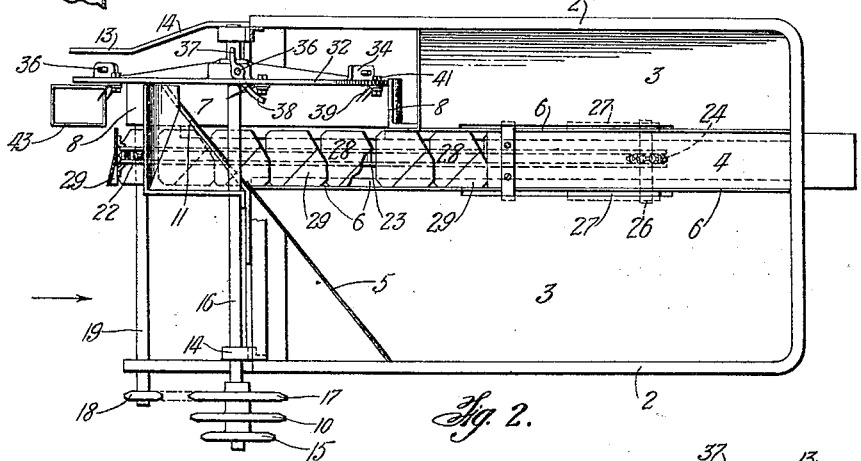
Fig. 2.
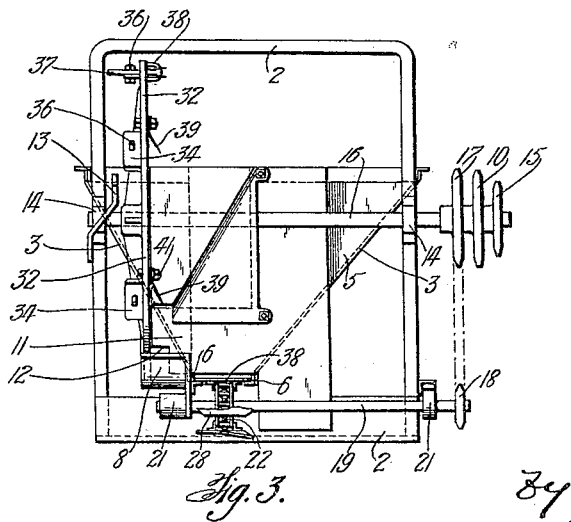
Fig. 3.
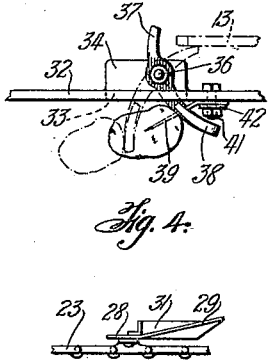
Fig. 4.
Fig. 5.
Inventor
J. B. Crump
By [signature]
His Atty.

UNITED STATES PATENT OFFICE.

JOHN B. CRUMP, OF BALLARAT, VICTORIA, AUSTRALIA.

APPARATUS FOR PLANTING SEED-POTATOES.

1,401,885. Specification of Letters Patent. Patented Dec. 27, 1921.

Application filed September 2, 1919. Serial No. 321,223.

*To all whom it may concern:*

Be it known that I, JOHN BRETNELL CRUMP, implement-maker, a subject of the King of Great Britain and Ireland, and a resident of the city of Ballarat, in the county of Grenville, State of Victoria, Commonwealth of Australia, (whose post-office address is 23 Loch avenue, in the said city of Ballarat,) previously an air mechanic on active service with the Australian Flying Corps, Seventh Squadron, have invented certain new and useful Improvements Connected with Apparatus for Planting Seed-Potatoes, of which the following is a specification.

This invention relates to apparatus mounted on a plow or similar implement for sowing seed potatoes, the seeds being dropped into a furrow in the soil as the plow is drawn forward.

The object of the invention is to produce an apparatus for attachment to a plow for the purpose indicated which will be comparatively light and simple and not liable to derangement, but more particularly to provide means whereby the potato seeds may be positively elevated from the feed hopper, and dropped into the furrow. By the invention more even planting and growth is obtained as should an irregularly shaped seed escape being picked up by a needle it is securely held between the needle and its supporting disk until removed for deposit in a furrow. The apparatus is so constructed and mounted that the weight of the seed potatoes in the hopper is almost wholly supported by the land wheel of the plow which reduces the draft to a minimum. The apparatus has been found to be effective for planting under wet or dry conditions.

A feature of the invention resides in the use of a series of fixed needles as opposed to the sliding spring controlled needles hitherto employed which were not positive in action and were liable to become easily deranged.

It is considered that it is broadly novel to employ a series of fixed spring needles of the peculiar shape described carried by a rotary disk moving the needles in a direction opposed to the movement of a conveyer carrying the seeds in the hopper directly to the needles, said needles being in close proximity to one edge of the conveyer.

Referring to the drawings which form part of this specification:—

Figure 1 is a part sectional side elevation of the invention, portions being broken away and omitted for convenience of illustration. Only six of the conveyer plates are shown in this view, it being understood that they actually extend the whole length of the conveyer. Likewise only the upper tripping lever is shown in place, the others being removed to show clearly the needles and the slots in the disk.

Fig. 2 is a plan of Fig. 1 all the visible conveyer plates being shown. Parts are broken away and omitted for convenience of illustration.

Fig. 3 is an end view looking in the direction of the arrow seen in Fig. 2. Parts are broken away and removed for convenience of illustration.

Fig. 4 is an enlarged detail view showing in full lines the tripping lever in position to receive the potato and in dotted lines its position when the potato is ejected.

Fig. 5 is an enlarged detail side view showing the attachment of a conveyer plate to the chain and also illustrating the use of a diagonal rib on said plate.

According to the invention the planter is suitably attached to a plow or other implement not shown, and is preferably driven from the back wheel of the plow.

The framework 2 of the planter supports an open topped hopper. This has a diagonal end 5 and inclined sides 3 which converge to a longitudinal opening at the bottom of the hopper for a conveyer belt hereinafter referred to. The bottom of the hopper preferably inclines downwardly as seen in Fig. 1 toward the needle carrying disk hereinafter described. The length of the longitudinal opening at the bottom of the hopper is controlled by a sliding door 4 which moves in guideways formed by two angle pieces 6 at opposite sides of the opening and enables the feed of the potatoes from the hopper to be regulated.

The hopper has at its delivery end a seed concentrating chamber 7 (Fig. 2) formed by a circumferential angle plate 8 attached to the framework. Adjoining the seed concentrating chamber is a wheel or disk hereinafter described carrying a series of needles or spikes. A directing plate 11 is arranged opposite the said disk or wheel and directs the seed into the concentrating chamber. Through the directing plate is an opening 12 to pass the needles as the disk rotates.

The framework has attached to it a tripper 13 for operating a tripping lever hereinafter referred to.

To the framework are attached bearings 14 which support a shaft 16 driven preferably from the back wheel of the plow, by a chain or the like adapted to engage either of the sprockets 10, 15 which will drive the apparatus at different speeds according to the distance apart it is desired to plant the seed in the furrow. Upon the shaft 16 is a sprocket wheel 17 driving by a sprocket chain, a sprocket wheel 18 on a shaft 19 mounted in bearings 21 on the framework and the angle plate 8.

The shaft has a sprocket 22 thereon which drives a conveyer chain 23. The other end of the chain passes over a sprocket 24 on an axle 26 mounted in adjustable bearings 27. To the conveyer chain are attached conveyer plates 28. The leading edge of each of these plates is preferably secured to the belt as in Fig. 5. One corner of the free or trailing end of each plate may be up-turned as at 29 thereby forming an accelerator, which also serves to direct the potatoes toward the needles.

In addition to or in lieu of each plate having an up-turned corner 29 the plates may be provided with diagonal ribs 31 (Fig. 5) or may be corrugated or tongued or spiked or otherwise treated to direct the seed to the spikes or needles of the needle disk.

Upon the shaft 16 is a spiking disk or wheel 32. Through this wheel are a series of tripping lever slots 33. Adjoining each slot and outside the disk or wheel is a lug 34 carrying a pivot pin 36.

To each pivot pin is pivoted the intermediate portion of a tripping lever 37. One end of this protrudes through the disk 32 toward the seed feeding side of same and is provided with a pair of fingers 38 between which and the lever the needles are accommodated. The outer or striking end of the tripping lever extends outside the disk and is preferably bent backwardly as in Fig. 4 to engage with the tripper 13 before referred to.

To the disk or wheel and on the conveyer side of same and near to each slot 33 are securely attached needles or spikes 39. These are preferably made of spring steel wire or other suitable material. They may be round, square or of other section and are bent to represent approximately the letter U, the length of the legs of which depends upon circumstances. The ends are pointed and may be of ordinary character or provided with special protuberances to prevent the seed potato being accidentally detached. The legs are outset from the disk or wheel 32 and are preferably at an acute angle to the surface thereof as seen clearly in Fig. 4. The bowed portion of each needle or spike may be attached to the wheel 32 by a bolt 41 and washer 42 or other arrangements, which may incorporate means for adjusting the position of the needles on the disk. The shape and arrangement of these needles is an essential feature of the invention.

In operation the seed is carried by the conveyer from the hopper to the concentrating chamber 7 against the inside face of the revolving disk, they are diverted into this chamber by the directing plate 11 and the upturned rear ends of the conveyer plates and as they gather there are impaled on the points of the needles as the disk rotates. Should a needle happen to miss spiking a potato it will invariably be caught between the needle and the face of the disk. As the disk rotates the potatoes are carried around by the needles until the outer end of the tripping lever engages the tripper 13 as seen in Fig. 4 causing the inner end of the lever to swing forward and eject the potato from the needle. This operation is repeated as each of the tripping levers successively engages the tripper the ejected potatoes falling through the delivery chute 43 into the furrow. The tripping levers are re-set by their inner ends engaging the directing plate 11 as they pass through the opening 12 before picking up the next potato, thus the use of springs for resetting or in any other part of the apparatus is entirely eliminated.

Having now described my invention what I claim as new and desire to secure by Letters Patent is:—

1. In apparatus for planting seed potatoes, a revolving element having a series of fixed needles or spikes angularly inclined to the side face of said element substantially as and for the purpose set forth.

2. In apparatus for planting seed potatoes, a rotary element having a series of slots therethrough and a fixed needle attached to said element adjacent each slot, said needle comprising a substantially U shaped spring member forming a pair of spikes which are disposed at opposite sides of said slot and are angularly inclined to the side of the element substantially as described.

3. In apparatus for planting seed potatoes, a revolving element having a series of fixed needles or spikes angularly inclined to its side face, a tripping lever associated with each of said needles, means for operating said tripping lever to eject the potato and means for resetting the tripping lever after the potato has been ejected.

4. In apparatus for planting seed potatoes, a seed hopper or reservoir, a rotating element carrying a series of fixed needles or spikes, and a conveyer leading from said hopper to said element, said element being rotated in a direction opposed to the direction of travel of the conveyer.

5. In apparatus for planting seed potatoes, a seed hopper or reservoir, a conveyer leading therefrom, a rotary element near the outlet of said hopper, a series of fixed needles carried by said element, means for diverting the potatoes from the conveyer to the side of the element and the needles and means operating through the element for ejecting the potatoes from the needles.

6. In apparatus for planting seed potatoes, a seed hopper or reservoir, a rotating element carrying on one face a series of fixed needles or spikes, a conveyer leading from said hopper to said element and traveling in a direction opposed to the direction of rotation of the element and a directing plate adapted to direct the seed from the conveyer against said face of said element.

7. In apparatus for planting seed potatoes, a hopper, a conveyer leading therefrom, a seed concentrating chamber adjacent the outlet from the hopper, a rotary disk adjacent said concentrating chamber, means for diverting the potatoes from the conveyer into the concentrating chamber, a series of fixed needles carried by said disk and angularly inclined to its inner face, an intermediately pivoted tripping lever associated with each of said needles, a tripper adapted to engage the outer ends of said levers to eject the potato and means for resetting said levers by contact with their inner ends as the disk rotates.

8. In apparatus for planting seed potatoes, a hopper, a conveyer passing beneath said hopper, said conveyer comprising a series of plates having upstanding diagonal projections at their rear ends, means for controlling the passage of seed from the hopper to the conveyer, a rotary disk or wheel located near the delivery end of said conveyer and rotating in a direction opposite to the movement of the conveyer, a series of needles or spikes carried on the inner side of said disk, a seed concentrating chamber between one side of the conveyer and the inner side of said disk, a directing plate for diverting the potatoes from the conveyer to the concentrating chamber, and means for ejecting the potatoes from the needles.

In testimony whereof I affix my signature.

JOHN B. CRUMP.

Witness:
CECIL McCLASTNER.